(12) United States Patent
Ma et al.

(10) Patent No.: US 12,225,106 B2
(45) Date of Patent: Feb. 11, 2025

(54) FILE SHARING METHOD AND SYSTEM, ELECTRONIC DEVICE AND READABLE STORAGE MEDIUM

(71) Applicant: SUZHOU METABRAIN INTELLIGENT TECHNOLOGY CO., LTD., Jiangsu (CN)

(72) Inventors: Fuqiang Ma, Jiangsu (CN); Zheng Xu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/718,764

(22) PCT Filed: Nov. 7, 2022

(86) PCT No.: PCT/CN2022/130386
§ 371 (c)(1),
(2) Date: Jun. 11, 2024

(87) PCT Pub. No.: WO2023/226308
PCT Pub. Date: Nov. 30, 2023

(65) Prior Publication Data
US 2024/0421974 A1 Dec. 19, 2024

(30) Foreign Application Priority Data

May 27, 2022 (CN) .......................... 202210583975.6

(51) Int. Cl.
*H04L 9/06* (2006.01)
*H04L 9/08* (2006.01)
*H04L 9/30* (2006.01)

(52) U.S. Cl.
CPC .......... *H04L 9/0618* (2013.01); *H04L 9/0869* (2013.01); *H04L 9/3066* (2013.01)

(58) Field of Classification Search
CPC ... H04L 9/0618; H04L 9/0869; H04L 9/3066; H04L 9/08; H04L 9/30; H04L 9/06
See application file for complete search history.

(56) References Cited

U.S. PATENT DOCUMENTS

| | | | |
|---|---|---|---|
| 11,882,117 B1 * | 1/2024 | Kumar | H04L 9/0819 |
| 2015/0033016 A1 * | 1/2015 | Thornton | H04L 9/0869 |
| | | | 713/171 |

(Continued)

FOREIGN PATENT DOCUMENTS

| | | |
|---|---|---|
| CN | 101958793 A | 1/2011 |
| CN | 102624527 A | 8/2012 |

(Continued)

OTHER PUBLICATIONS

Jiang, Mingming, Lijun Zhao, and Yan Wang. "Quantum-security certificateless bidirectional proxy re-encryption for cloud data sharing." Netinfo Security 18.8 (2018): 17-24.

*Primary Examiner* — Quazi Farooqui
(74) *Attorney, Agent, or Firm* — IPro, PLLC

(57) ABSTRACT

The present disclosure discloses a file sharing method and system. The method includes: obtaining a target file and determining a first dynamic key corresponding to the target file; generating a first private key based on the first dynamic key and double private keys; selecting unpaired public and private keys, and generating a first public key based on the first dynamic key, the selected public and private keys; encrypting a symmetric key using the first public key to obtain a key ciphertext; encrypting the target file using the symmetric key to obtain a file ciphertext; signing the first dynamic key, the first public key, the key ciphertext and the file ciphertext using the first private key to obtain signature information; and uploading the first dynamic key, the first public key, the key ciphertext, the file ciphertext and the (Continued)

signature information to a cloud sharing end to share the target file.

20 Claims, 6 Drawing Sheets

(56) References Cited

U.S. PATENT DOCUMENTS

| | | | |
|---|---|---|---|
| 2017/0012949 A1* | 1/2017 | Boren | ................... H04L 63/045 |
| 2022/0150220 A1 | 5/2022 | Verheyen | |

FOREIGN PATENT DOCUMENTS

| | | |
|---|---|---|
| CN | 109144961 A | 1/2019 |
| CN | 111191288 A | 5/2020 |
| CN | 112564907 A | 3/2021 |
| CN | 112702167 A | 4/2021 |
| CN | 113360886 A | 9/2021 |
| CN | 114679340 A | 6/2022 |
| WO | 2022007889 A1 | 1/2022 |

* cited by examiner

FILE SHARING METHOD AND SYSTEM, ELECTRONIC DEVICE AND READABLE STORAGE MEDIUM

CROSS-REFERENCE TO RELATED APPLICATION

The present disclosure claims the priority of Chinese patent application filed on May 27, 2022 before the CNIPA, China National Intellectual Property Administration with the application number of 202210583975.6, and the title of "FILE SHARING METHOD, SYSTEM, DEVICE AND READABLE STORAGE MEDIUM", which is incorporated herein in its entirety by reference.

FIELD

The present disclosure relates to the field of computer technologies, and more particularly to a file sharing method and system, a device and a non-transitory readable storage medium.

BACKGROUND

In general, an existing data sharing solution is that a data owner encrypts data with a private key of the data owner, and a data accessor decrypts the data with a public key corresponding to the private key of the data owner. This process not only needs to share the public key of the data owner, but also needs to encrypt the data with the private key of the data owner, and thus the security of the private key of the data owner cannot be guaranteed. Moreover, all files are encrypted with the private key of the data owner, which may lead to data leakage due to the private key not being updated for a long time.

SUMMARY

In view of this, an object of the present disclosure is to provide a file sharing method and system, an electronic device and a readable storage medium, so as to improve the security of key data and data itself in the data sharing method. Solutions are as follows.

In a first aspect, the present disclosure provides a file sharing method, being applicable to a file owning end, including:
  obtaining a target file to be shared, and determining a first dynamic key corresponding to the target file;
  generating a first private key based on the first dynamic key and double private keys of the file owning end;
  selecting unpaired public and private keys from two pairs of public and private keys of the file owning end, and generating a first public key based on the first dynamic key, the selected public and private keys;
  encrypting a symmetric key selected randomly using the first public key to obtain a key ciphertext;
  encrypting the target file using the symmetric key to obtain a file ciphertext;
  signing the first dynamic key, the first public key, the key ciphertext and the file ciphertext using the first private key to obtain signature information; and
  uploading the first dynamic key, the first public key, the key ciphertext, the file ciphertext and the signature information as shared information to a cloud sharing end to share the target file.

In some embodiments, determining the first dynamic key corresponding to the target file includes:
  determining a type of the target file, and determining the first dynamic key corresponding to the target file according to the type, wherein the type is classified according to a file format or a file importance.

In some embodiments, determining the first dynamic key corresponding to the target file according to the type includes:
  in response to using the same first dynamic key for files of the same type, when there is a file of the same type as the target file in the historical upload information, determining a first dynamic key of the file of the same type in the historical upload information as the first dynamic key corresponding to the target file; and in response to using different first dynamic keys for the files of the same type, calculating the first dynamic key corresponding to the target file based on a random number.

In some embodiments, determining the first dynamic key corresponding to the target file includes:
  in response to using different first dynamic keys for different files, calculating the first dynamic key corresponding to the target file based on a random number.

In some embodiments, the method further includes:
  sending an update request of the shared information to the cloud sharing end to enable the cloud sharing end to update the shared information using new shared information of the target file in the update request.

In some embodiments, sending the update request of the shared information to the cloud sharing end includes:
  sending an update request for updating the first dynamic key, the first public key, the key ciphertext, the file ciphertext or the signature information to the cloud sharing end.

In some embodiments, signing the first dynamic key, the first public key, the key ciphertext and the file ciphertext using the first private key to obtain signature information includes:
  splicing the first dynamic key, the first public key, the key ciphertext and the file ciphertext to obtain a splicing result;
  converting the splicing result into a hash string; and
  signing the hash string using the first private key to obtain the signature information.

In a second aspect, the present disclosure provides a file sharing method, including:
  generating, by a file accessing end, a second dynamic key, generating a second public key based on the second dynamic key and two pairs of public and private keys of the file accessing end, and sending an access request of a target file to a cloud sharing end;
  querying, by the cloud sharing end, shared information of the target file based on the access request, wherein the shared information includes a first dynamic key, a first public key, a key ciphertext, a file ciphertext and signature information; and sending the first dynamic key, the first public key and the second public key in the access request to a file owning end, wherein the shared information is obtained based on the method described in the first aspect;
  generating, by the file owning end, a first public key based on the first dynamic key and two pairs of public and private keys of the file owning end, in response to the first public key sent by the cloud sharing end being equal to the first public key generated by the file owning end, generating a first private key based on the first dynamic key and double private keys of the file owning end, generating a re-encryption key based on the first private key and the second public key, and sending the re-encryption key to the cloud sharing end;

re-encrypting, by the cloud sharing end, the key ciphertext using the re-encryption key to obtain a key re-encryption ciphertext, and sending the key re-encryption ciphertext, the first public key, the first dynamic key, the key ciphertext, the file ciphertext and the signature information to the file accessing end; and verifying, by the file accessing end, the signature information using the first public key to obtain a target result, in response to the target result being consistent with the first dynamic key, the first public key, the key ciphertext and the file ciphertext sent by the cloud sharing end, calculating a second private key using the second dynamic key and double private keys of the file accessing end, decrypting the key re-encryption ciphertext using the second private key to obtain a symmetric key, and decrypting the file ciphertext using the symmetric key to obtain a plaintext of the target file.

In some embodiments, before querying, by the cloud sharing end, the shared information of the target file based on the access request, the method further includes:

verifying, by the cloud sharing end, a validity of the file accessing end; in response to the file accessing end being valid, querying, by the cloud sharing end, the shared information of the target file based on the access request; and in response to the file accessing end being invalid, returning, by the cloud sharing end, a notification message indicating that an access is invalid to the file accessing end.

In some embodiments, the method further includes:

querying, by the file owning end and/or the file accessing end the file ciphertext stored in the cloud sharing end based on a ciphertext search technology.

In a third aspect, the present disclosure provides a file sharing method, being applicable to a file owning end, including:

downloading shared information from a cloud sharing end, wherein the shared information includes a first dynamic key, a first public key, a key ciphertext, a file ciphertext and signature information, and the shared information is obtained based on the above method;

after verifying that the signature information passes based on the first public key, generating a first private key based on the first dynamic key and double private keys of the file owning end;

decrypting the key ciphertext using the first private key to obtain a symmetric key; and decrypting the file ciphertext using the symmetric key to obtain a plaintext of a target file.

In a fourth aspect, the present disclosure provides a file sharing system, including: the file owning end, the cloud sharing end and the file accessing end described above, wherein the file owning end further performs the method described above.

In some embodiments, the file sharing system further includes a key generation center configured to provide public and private key pairs and parameters for encryption and decryption for the file owning end and the file accessing end.

In a fifth aspect, the present disclosure provides an electronic device, including:

a memory for storing a computer program; and a processor for executing the computer program to implement the file sharing method disclosed above.

In a sixth aspect, the present disclosure provides a non-transitory readable storage medium storing computer programs, wherein the computer programs, when executed by a processor, cause the processor to implement the file sharing method disclosed above.

Based on the above solutions, the present disclosure provides a file sharing method, being applicable to a file owning end, including: obtaining a target file to be shared, and determining a first dynamic key corresponding to the target file; generating a first private key based on the first dynamic key and double private keys of the file owning end; selecting unpaired public and private keys from two pairs of public and private keys of the file owning end, and generating a first public key based on the first dynamic key, the selected public and private keys; encrypting a symmetric key selected randomly using the first public key to obtain a key ciphertext; encrypting the target file using the symmetric key to obtain a file ciphertext; signing the first dynamic key, the first public key, the key ciphertext and the file ciphertext using the first private key to obtain signature information; and uploading the first dynamic key, the first public key, the key ciphertext, the file ciphertext and the signature information as shared information to a cloud sharing end to share the target file.

It may be seen that in the present disclosure, the file owning end is provided with two pairs of public and private keys, and the file is not directly encrypted using the double private keys in the two pairs of public and private keys, but the first private key is generated according to the double private keys, then the symmetric key used for encrypting the file is encrypted using the first public key, thereby reducing the risk that the double private keys of the file owning end are leaked. At the same time, the method may dynamically change the first dynamic key, the first private key and the first public key corresponding to different files, which not only avoids the privacy data such as encryption keys is not updated in the long past, but also reduces the leakage risk of such privacy data and shared data. The method may also finely encrypt different files, and set different access rights for different files, thereby improving the security of shared files.

The present disclosure further provides a file sharing system, a device and a non-transitory readable storage medium, which have the above technical effects.

BRIEF DESCRIPTION OF THE DRAWINGS

In order to more clearly illustrate the technical solutions of the embodiments of the present disclosure or the prior art, the figures that are required to describe the embodiments of the present disclosure or the prior art will be briefly described below. Apparently, the figures that are described below are merely the embodiments of the present disclosure, and a person skilled in the art can obtain other figures according to the provided figures without paying creative work.

DETAILED DESCRIPTION

The following clearly and completely describes the technical solutions in the embodiments of the present disclosure with reference to the accompanying drawings in the embodiments of the present disclosure. Apparently, the described embodiments are merely certain embodiments of the present disclosure, rather than all of the embodiments. All of the other embodiments that a person skilled in the art obtains based on the embodiments of the present disclosure without paying creative work fall within the protection scope of the present disclosure.

At present, the existing data sharing solution not only needs to share a public key of a data owner, but also needs to encrypt data with a private key of the data owner, and thus the security of the private key of the data owner cannot be guaranteed. Moreover, all files are encrypted with the private key of the data owner, which may lead to data leakage due to the private key not being updated for a long time. To this end, the present disclosure provides a data sharing method, which may dynamically change key data corresponding to different files, thereby improving the security of key data and data itself in the data sharing method.

Figure 1:
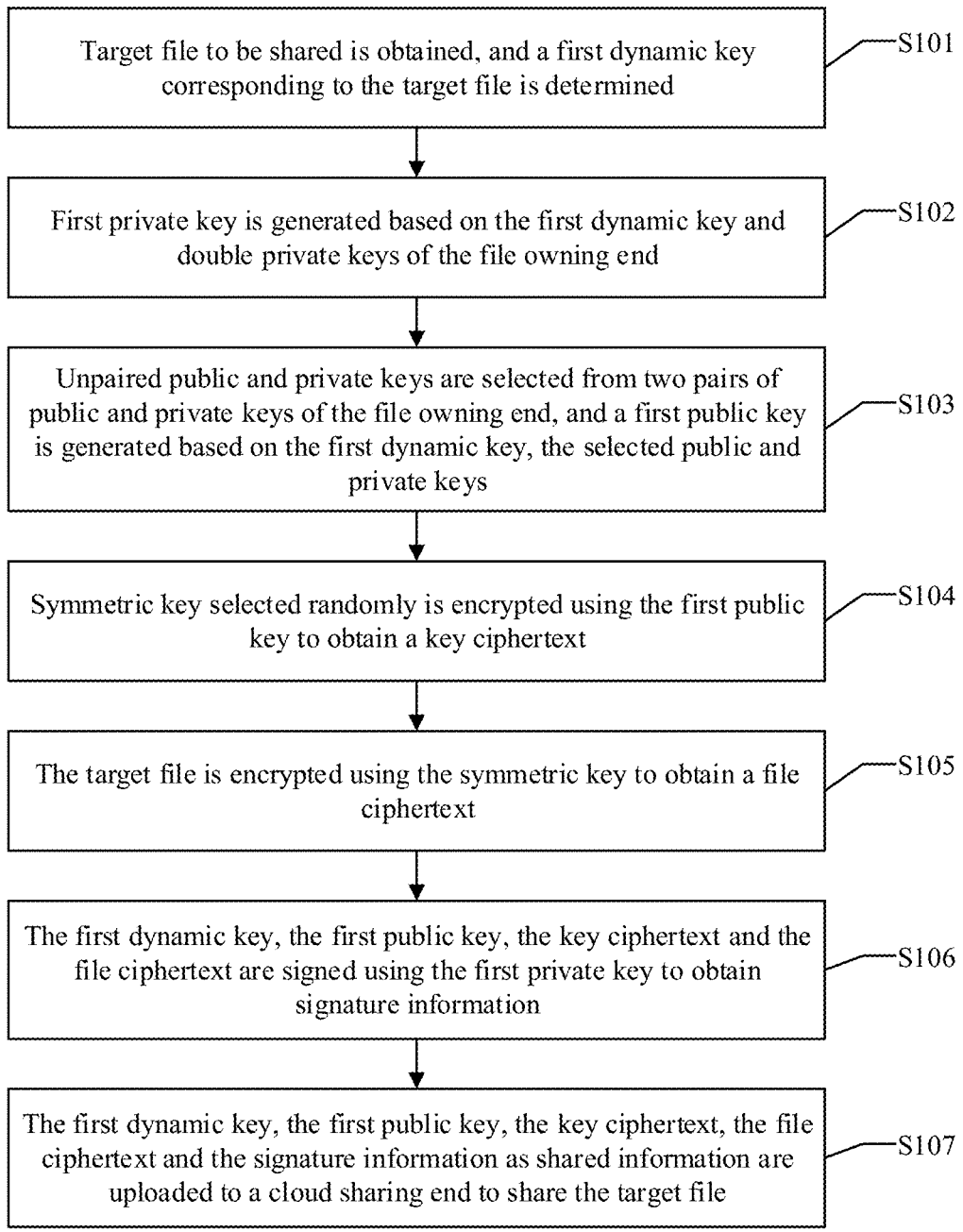
FIG. 1 is a flowchart of a file sharing method according to the present disclosure.

Referring to FIG. 1, an embodiment of the present disclosure discloses a file sharing method, being applicable to a file owning end, including the following steps.

S101, a target file to be shared is obtained, and a first dynamic key corresponding to the target file is determined.

The target file can be generated by the file owning end, or can be a file obtained or received by the file owning end from elsewhere. Data in the file may be messages, strings, packets, documents, codes, and the like.

In an embodiment, one or more files can be classified according to a file format or a file importance, and then a first dynamic key corresponding to each of the files can be determined according to a type of the classified file, so that the same first dynamic key can be used for the files of the same type. To this end, the type of the uploaded file and the used first dynamic key can be recorded in the historical upload information for subsequent queries. In an embodiment, determining the first dynamic key corresponding to the target file includes: determining a type of the target file, and determining the first dynamic key corresponding to the target file according to the type, wherein the type is classified according to a file format or a file importance. Determining the first dynamic key corresponding to the target file according to the type includes: in response to using the same first dynamic key for files of the same type, when there is a file of the same type as the target file in the historical upload information, determining a first dynamic key of the file of the same type in the historical upload information as the first dynamic key corresponding to the target file; and in response to using different first dynamic keys for the files of the same type, calculating the first dynamic key corresponding to the target file based on a random number.

The importance of the file can be defined by a file owner. For example, files such as payments and settlements involved in an e-commerce system of the file owner can be set to an important level, and files such as product introductions can be set to a secondary level, and so on. Alternatively, the importance of the file can also be simply set to high, medium or low. The file owner labels each of his/her files with high, medium or low, so that the files can be classified according to the label later.

In an embodiment, different first dynamic keys can be used for different files, that is, one file corresponds to one first dynamic key. Therefore, in an embodiment, determining the first dynamic key corresponding to the target file includes: in response to using different first dynamic keys for different files, calculating the first dynamic key corresponding to the target file based on a random number. For example, the first dynamic key $R_1=r_1G$, $r_1$ is the random number, G is the base point of the elliptic curve, and $G \in G_1$, $G_1$ is an elliptic curve addition cyclic group of an order p.

S102, a first private key is generated based on the first dynamic key and double private keys of the file owning end.

S103, unpaired public and private keys are selected from two pairs of public and private keys of the file owning end, and a first public key is generated based on the first dynamic key, the selected public and private keys.

In the embodiment, the execution order of S102 and S103 can be interchanged, and the implementation of the embodiment will not be affected after the interchange.

S104, a symmetric key selected randomly is encrypted using the first public key to obtain a key ciphertext.

S105, the target file is encrypted using the symmetric key to obtain a file ciphertext.

S106, the first dynamic key, the first public key, the key ciphertext and the file ciphertext are signed using the first private key to obtain signature information.

The first dynamic key, the first public key, the key ciphertext and the file ciphertext can be spliced first, then the splicing result can be converted into a hash string, and the converted hash string can be signed using the first private key to obtain the signature information. Therefore, in an embodiment, signing the first dynamic key, the first public key, the key ciphertext and the file ciphertext using the first private key to obtain signature information includes: splicing the first dynamic key, the first public key, the key ciphertext and the file ciphertext to obtain a splicing result; converting the splicing result into a hash string; and signing the hash string using the first private key to obtain the signature information.

S107, the first dynamic key, the first public key, the key ciphertext, the file ciphertext and the signature information as shared information are uploaded to a cloud sharing end to share the target file.

Alternatively, the file owning end can also change the shared information of the target file on the cloud sharing end at any time to change an access key of the target file, that is, an access right of the target file is also changed. Therefore, in an embodiment, a deletion request of the shared information is sent to the cloud sharing end, so that the cloud sharing end can delete the shared information; and then the file owning end generates new shared information for the target file and uploads the new shared information to the cloud sharing end to change the shared information of the target file. Alternatively, the file owning end can generate new shared information for the target file without sending the deletion request, then directly upload the new shared information to the cloud sharing end, and subsequently, the cloud sharing end can update the shared information of the target file based on the new shared information. Therefore, the file owning end also sends an update request for the shared information to the cloud sharing end, so that the cloud sharing end can update the shared information using the new shared information of the target file in the update request. Therefore, in an embodiment, sending the update request of the shared information to the cloud sharing end includes: sending an update request for updating the first dynamic key, the first public key, the key ciphertext, the file ciphertext or the signature information to the cloud sharing end. It may be seen that any information in the shared information may be updated, thereby ensuring the security of the file.

It may be seen that in the present disclosure, the file owning end is provided with two pairs of public and private keys, and the file is not directly encrypted using the double private keys in the two pairs of public and private keys, but the first private key is generated according to the double private keys, then the symmetric key used for encrypting the file is encrypted using the first public key, thereby reducing the risk that the double private keys of the file owning end are leaked. At the same time, the method may dynamically change the first dynamic key, the first private key and the first public key corresponding to different files, which not only avoids the privacy data such as encryption keys is not updated in the long past, but also reduces the leakage risk of such privacy data and shared data. The method may also finely encrypt different files, and set different access rights for different files, thereby improving the security of shared files.

The embodiment of the present disclosure discloses another file sharing method. The method is executed after the file ciphertext is uploaded to the cloud sharing end, that is, the steps shown in FIG. 2 are executed after the steps shown in FIG. 1 are executed.

Figure 2:
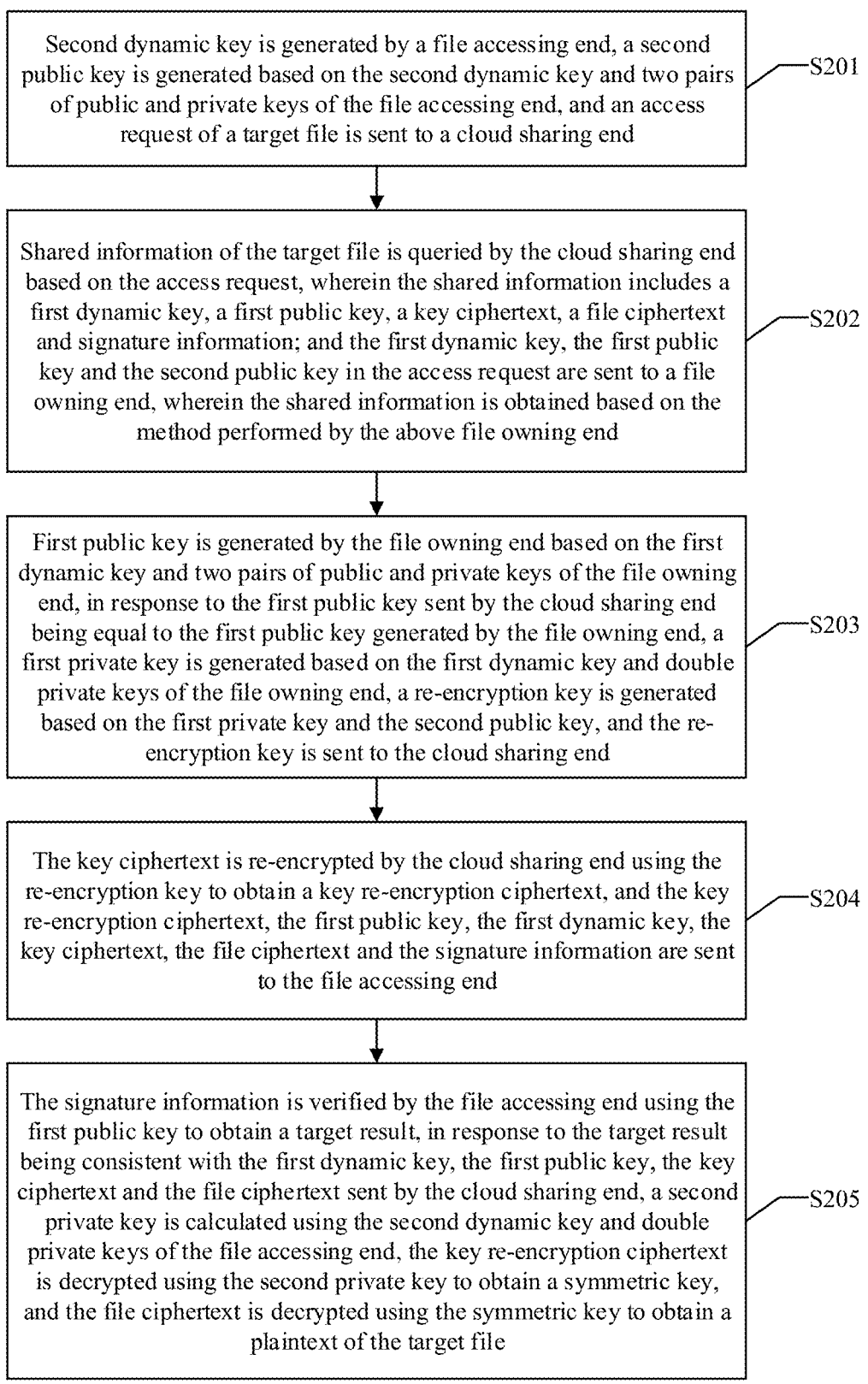
FIG. 2 is a flowchart of another file sharing method according to the present disclosure.

Referring to FIG. 2, the method provided by the embodiment includes:

S201, a second dynamic key is generated by a file accessing end, a second public key is generated based on the second dynamic key and two pairs of public and private keys of the file accessing end, and an access request of a target file is sent to a cloud sharing end;

S202, shared information of the target file is queried by the cloud sharing end based on the access request, wherein the shared information includes a first dynamic key, a first public key, a key ciphertext, a file ciphertext and signature information; and the first dynamic key, the first public key and the second public key in the access request are sent to a file owning end, wherein the shared information is obtained based on the method performed by the above file owning end;

S203, a first public key is generated by the file owning end based on the first dynamic key and two pairs of public and private keys of the file owning end, in response to the first public key sent by the cloud sharing end being equal to the first public key generated by the file owning end, a first private key is generated based on the first dynamic key and double private keys of the file owning end, a re-encryption key is generated based on the first private key and the second public key, and the re-encryption key is sent to the cloud sharing end;

S204, the key ciphertext is re-encrypted by the cloud sharing end using the re-encryption key to obtain a key re-encryption ciphertext, and the key re-encryption ciphertext, the first public key, the first dynamic key, the key ciphertext, the file ciphertext and the signature information are sent to the file accessing end; and S205, the signature information is verified by the file accessing end using the first public key to obtain a target result, in response to the target result being consistent with the first dynamic key, the first public key, the key ciphertext and the file ciphertext sent by the cloud sharing end, a second private key is calculated using the second dynamic key and double private keys of the file accessing end, the key re-encryption ciphertext is decrypted using the second private key to obtain a symmetric key, and the file ciphertext is decrypted using the symmetric key to obtain a plaintext of the target file.

The signature information is verified by file accessing end using the first public key to obtain a target result, and the obtained target result includes hash values of a first dynamic key, a first public key, a key ciphertext and a file ciphertext. Further, the hash values of the first dynamic key, the first public key, the key ciphertext and the file ciphertext are compared with hash values of the first public key, the first dynamic key, the key ciphertext and the file ciphertext sent by the cloud sharing end; in response to the hash values of the first dynamic key, the first public key, the key ciphertext and the file ciphertext being consistent with the hash values of the first public key, the first dynamic key, the key ciphertext and the file ciphertext sent by the cloud sharing end, it is determined that the target result is consistent with the signature information, that is, the verification succeeds; and in response to the hash values of the first dynamic key, the first public key, the key ciphertext and the file ciphertext being inconsistent with the hash values of the first public key, the first dynamic key, the key ciphertext and the file ciphertext sent by the cloud sharing end, it is determined that the verification fails.

In an embodiment, before querying, by the cloud sharing end, the shared information of the target file based on the access request, the method further includes: verifying, by the cloud sharing end, a validity of the file accessing end; in response to the file accessing end being valid, querying, by the cloud sharing end, the shared information of the target file based on the access request; and in response to the file accessing end being invalid, returning, by the cloud sharing end, a notification message indicating that an access is invalid to the file accessing end. By verifying the validity of the file accessing end by the cloud sharing end, it can be verified whether the file accessing end is a valid user of the cloud sharing end, for example, information such as an account number and a password used by the file accessing end can be verified.

In an embodiment, the method further includes: querying, by the file owning end and/or the file accessing end the file ciphertext stored in the cloud sharing end based on a ciphertext search technology. That is, when the file owning end or the file accessing end wants to query a file on the cloud sharing end, keywords of the file are encrypted first, and then the query is performed based on the encrypted ciphertext. It may be seen that the cloud sharing end can only see the file ciphertext but not a plaintext of the file, thereby reducing the risk that the file itself is leaked by the cloud sharing end.

It may be seen that when the file ciphertext is uploaded to the cloud sharing end, the file accessing end may access the files in the cloud sharing end. This process uses a re-encryption technology, thereby further ensuring the security of the file.

The following embodiments introduce the solutions provided by the above two embodiments with specific algorithms.

A bilinear map set by a key generation center is e: $G_1 \times G_1 \to G_T$, where $G_1$ is an elliptic curve addition cyclic group of an order p, and $G_T$ is a multiplicative cyclic group of an order p. A base point $G \in G_1$, $Z=e(G, G)$ E $G_T$ of the elliptic curve is generated randomly, where Z is a result of the bilinear map of the base point G, e is the bilinear map, and a property of the bilinear map is: $e(aG, bG)=e(G, G)^{ab}$. $H\{0,1\}^* \to Z_q$, $Z_q$ is an integer cyclic group of an order q.

The data owner obtains two pairs of asymmetric public and private keys (a, A) and (b, B) of the data owner by using the key generation center, where a and b are private keys, and A and B are public keys. The public key A of the data owner is A=aG, a E $Z_q$, and the public key B is B=bG, b E $Z_q$. The symmetric key k E $G_T$. $r_1$ E $Z_q$ is randomly selected, then the first dynamic key $R_1=r_1 G$. The dynamic encryption public key $P_{11}=H(R_1 *a)*G+B$, and $P_{11}$ is the first public key. The dynamically encryption private key $P_{12}=H(a*R_1)+b$, and $P_{12}$ is the first private key. The symmetric key k is encrypted using $P_{11}$ to obtain a first-layer ciphertext $C_1=(rP_{11}, kZ^r)$, and r E $Z_q$, where $C_1$ is the key ciphertext. A file m is encrypted using k to obtain the file ciphertext $C=Enc_k(m)$, and Enc represents an encryption algorithm. After obtaining hash values of $R_1$, $C_1$ and C, then sign is performed using $P_{12}$ to obtain the signature information a, and then $\{R_1, P_{11}, C_1, C, \sigma\}$ are uploaded to a cloud service provider. Since the data owner loses control of the data after uploading the data to a semi-trusted cloud service provider, for security reasons, the data owner encrypts the data before uploading the data.

A data consumer obtains two pairs of asymmetric public and private keys (c, C) and (d, D) of the data consumer by using the key generation center, where c and d are private keys, and C and D are public keys, C=cG, c∈$Z_q$, D=dG, d∈$Z_q$. $r_2$ F $Z_q$ is randomly selected, then the second dynamic key $R_2=r_2 G$. The dynamic encryption public key $P_{21}=H(R_2*c)*G+D$, and $P_{21}$ is the second public key. The dynamically encryption private key $P_{22}=H(c*R_2)+d$, and $P_{22}$ is the second private key. After $R_2$ is generated, the random number $r_2$ can be deleted to ensure the security of the dynamic key and the dynamic encryption public key.

The data consumer requests the cloud service provider to access the shared information, and $P_{21}$ is included in request parameters. The cloud service provider preliminarily determines the validity of a user, and then sends $R_1$ and $P_{11}$ in the shared information and $P_{21}$ in the request parameters as a sharing request to the data owner.

After receiving the sharing request, the data owner calculates $P_{11}$ and $P_{21}$ using $R_1$ and two pairs of public and private keys of the data owner. When the calculated $P_{11}$ is consistent with $P_{11}$ sent by the cloud service provider, the re-encryption key $rk=(P_{22}/P_{12})G=(1/P_{12})P_{21}$ is obtained by using $P_{12}$ and $P_{21}$, and then the re-encryption key is uploaded to the cloud service provider.

The service provider uses the re-encryption key to re-encrypt the first-layer ciphertext in the shared information to obtain a second-layer ciphertext $C_2=(e(rP_{11}, rk), kZ^r)= (Z^{P_{22}r}, kZ^r)$, and $C_2$ is the key re-encryption ciphertext. The service provider sends $\{C_2, P_{11}, R_1, C_1, C, \sigma\}$ to the data consumer. The cloud service provider performs re-encryption and plays a role of ciphertext conversion, so that the ciphertext encrypted using the public key of the data owner can be converted into a ciphertext encrypted using the public key of the data owner for the same plaintext; and then the data consumer can decrypt the converted ciphertext using the private key of the data consumer. In the process of the ciphertext conversion, the cloud service provider has a re-encryption key for the data consumer authorized by the data owner, and the cloud service provider cannot obtain any information about the plaintext.

The data consumer calculates $R_2=r_2 G$ in advance. A target result is obtained by using $P_{11}$ to verify σ. If $\{P_{11}, R_1, C_1, C\}$ in the target result is consistent with $\{P_{11}, R_1, C_1, C\}$ sent by the service provider, $P_{22}$ is calculated by using $R_2$, c and d; $C_2$ is decrypted by using $P_{22}$ to obtain the symmetric key $$k = \frac{kZ^r}{\left(Z^{P_{22}r}\right)^{1/P_{22}}};$$

and C is decrypted by using k to obtain the plaintext of the file $m=Dec_k(C)$, where Dec represents a decryption algorithm.

It may be seen that the data owner encrypts the data before uploading the data, when the file ciphertext is uploaded to the cloud sharing end, the file accessing end may access the files in the cloud sharing end. This process uses a re-encryption technology, thereby further ensuring the security of the file.

A file sharing system provided by some embodiments of the present disclosure is described below, and the file sharing system described below and the file sharing method described above may be referred to each other.

Figure 9:
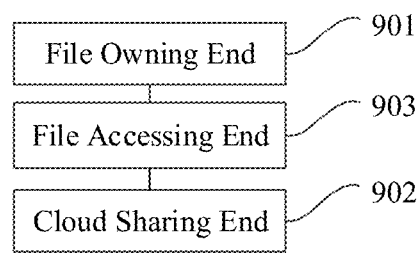
FIG. 9 is a structural block diagram of a file sharing system according to the present disclosure.

Referring to FIG. 9, an embodiment of the present disclosure discloses a file sharing system, including: a file owning end 901, a cloud sharing end 902 and a file accessing end 903 described above, and the file owning end 901 further executes the method in FIG. 1 and other methods available for its execution.

The file sharing system further includes a key generation center configured to provide public and private key pairs and parameters for encryption and decryption for the file owning end and the file accessing end. For details, refer to relevant introductions in other parts of the present disclosure, and the description thereof will not be repeated.

In an embodiment, the file owning end 901 is configured to determine a type of the target file, and determine the first dynamic key corresponding to the target file according to the type, wherein the type is classified according to a file format or a file importance.

In an embodiment, the file owning end 901 is configured to in response to using the same first dynamic key for files of the same type, when there is a file of the same type as the target file in the historical upload information, determine a first dynamic key of the file of the same type in the historical upload information as the first dynamic key corresponding to the target file; and in response to using different first dynamic keys for the files of the same type, calculate the first dynamic key corresponding to the target file based on a random number.

In an embodiment, the file owning end 901 is configured to in response to using different first dynamic keys for different files, calculate the first dynamic key corresponding to the target file based on a random number.

In an embodiment, the file owning end 901 is configured to send a deletion request of the shared information to the cloud sharing end, so that the cloud sharing end deletes the shared information; generate new shared information for the target file, and upload the new shared information to the cloud sharing end to change the shared information of the target file.

In an embodiment, before querying, by the cloud sharing end 901, the shared information of the target file based on the access request, the cloud sharing end verifies a validity of the file accessing end; in response to the file accessing end being valid, the cloud sharing end queries the shared information of the target file based on the access request; and in response to the file accessing end being invalid, the cloud sharing end returns a notification message indicating that an access is invalid to the file accessing end.

In an embodiment, the file owning end 901 and/or the file accessing end 903 query the file ciphertext stored in the cloud sharing end based on a ciphertext search technology.

Here, with regard to the operation of each end in the embodiment, reference may be made to the corresponding contents disclosed in the foregoing embodiments, and the description thereof will not be repeated.

It may be seen that the embodiment of the present disclosure provides a file sharing system, which may dynamically change key data corresponding to different files, thereby improving the security of key data and data itself in the data sharing method.

A file sharing method applied to a file owning end provided by an embodiment of the present disclosure is described below, and the file sharing method described below and related contents described elsewhere in the present disclosure may be referred to each other.

The embodiment of the present disclosure discloses a file sharing method, being applicable to a file owning end, including: downloading shared information from a cloud sharing end, wherein the shared information includes a first dynamic key, a first public key, a key ciphertext, a file ciphertext and signature information, and the shared information is obtained based on the method shown in FIG. 1; after verifying that the signature information passes based on the first public key, generating a first private key based on the first dynamic key and double private keys of the file owning end; decrypting the key ciphertext using the first private key to obtain a symmetric key; and decrypting the file ciphertext using the symmetric key to obtain a plaintext of a target file.

Figure 5:
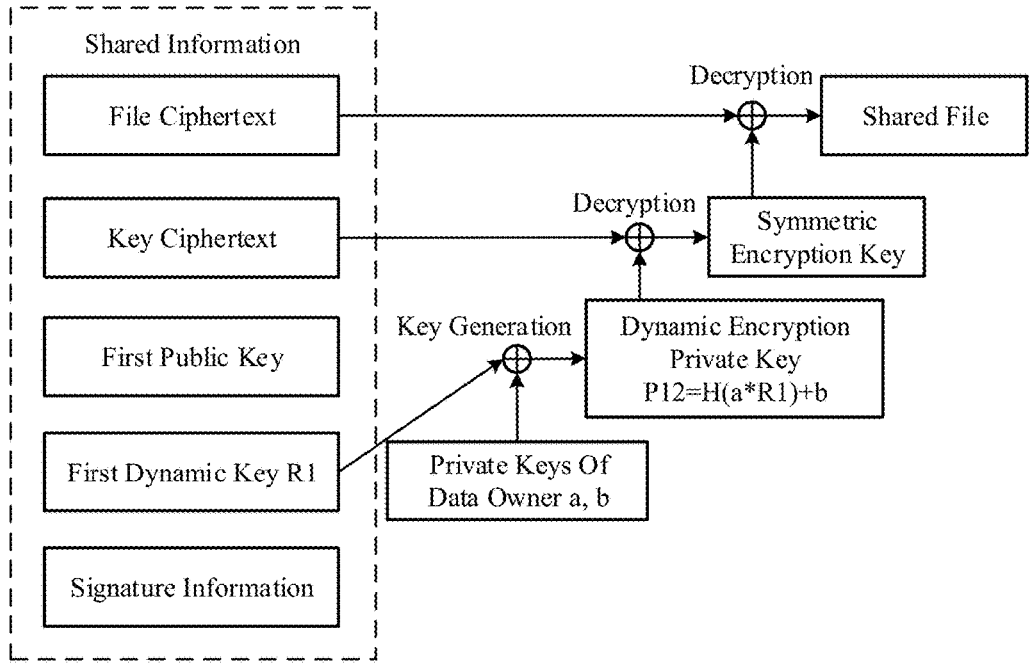
FIG. 5 is a schematic diagram of shared information accessed by a data owner according to the present disclosure.

The above process can refer to FIG. 5 and relevant introductions, it may be seen that the data owner may also download and decrypt the file ciphertext uploaded by the data owner from the cloud.

Based on the inventive concept of the present disclosure, the following embodiment provides a proxy re-encryption system based on dynamic keys. In the embodiment, by encrypting the shared files using the dynamic key, the private key of the user does not directly participate in encryption, thereby ensuring the security of the private key of the user. At the same time, in the embodiment, each shared file is encrypted with a separate key, a fine-grained decryption right assignment function may be realized. In addition, the conversion of decryption right may be realized through a proxy re-encryption technology.

The sharing system based on proxy re-encryption may realize the assignment of decryption right while maintaining the confidentiality of the data, and in practical application, the data owner usually only share some documents with their partners, not all cloud data. For example, sharing management-related data with a logistics department and sharing product information data with sales partners, rather than sharing all the data with every user. To this end, in the embodiment, a separate key is used for one file, which may realize the assigned sharing of the files instead of sharing all the files with a certain partner.

Figure 3:
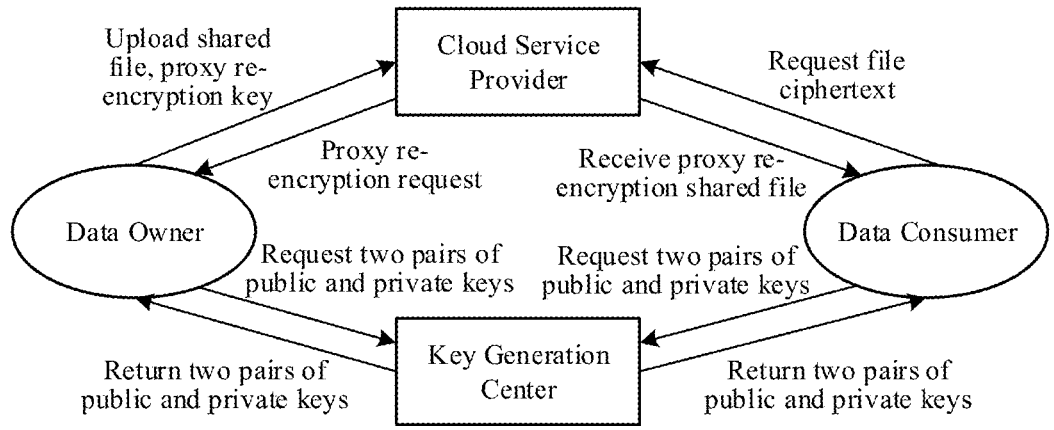
FIG. 3 is a schematic diagram of a file sharing system according to the present disclosure.

As shown in FIG. 3, the system provided by the embodiment includes a data owner, a data consumer, a cloud service provider and a key generation center. The data owner and the data consumer are respectively connected to the cloud service provider and the key generation center through interfaces.

The key generation center generates asymmetric public-private key pairs for the data owner and the data consumer.

The data owner is responsible for the preparation and generation of shared files, and obtains two pairs of asymmetric public and private keys (a, A) and (b, B) of the data owner by using the key generation center. The two private keys a and b are kept secret by the data owner forever and do not directly participate in the encryption operation.

Figure 4:
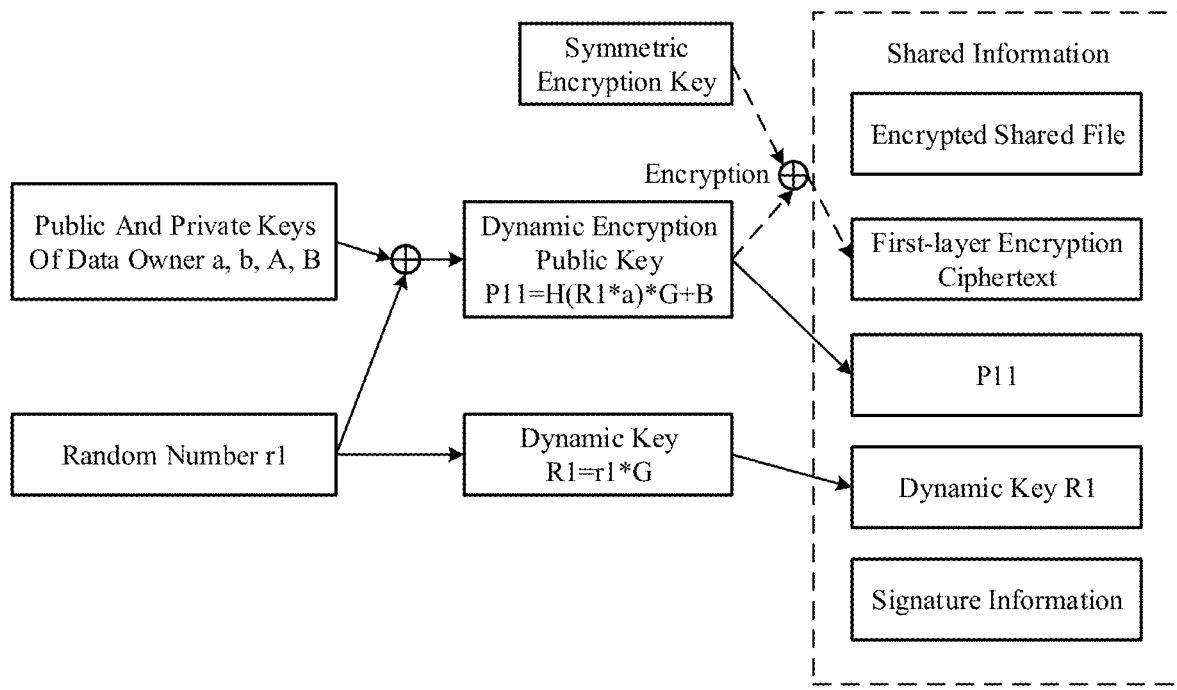
FIG. 4 is a schematic diagram of shared information generation according to the present disclosure.

As shown in FIG. 4, the data owner generates $R_1$ by using the random number $r_1$. The dynamic encryption public key $P_{11}$ is generated using $R_1$ and unpaired public and private keys, and the dynamic encryption private key $P_{12}$ is generated using $R_1$ and double private keys. $P_{12}$ is obtained by calculating based on two private keys, and thus the security of a dynamic private key may be realized. The random number $r_1$ is deleted to ensure the security of $R_1$ and $P_{11}$. The data owner generates the symmetric key k, encrypts the shared file to obtain the encrypted shared file (that is, the file ciphertext). The symmetric encryption key is encrypted using $P_{11}$ to obtain the first-layer encryption ciphertext. The signature information is calculated by using $P_{12}$. In this process, the dynamic encryption public key is used for encryption, and two pairs of public and private keys do not directly participate in the encryption operation, thereby reducing the possibility of key leakage and improving the security of the key. The encrypted shared file, the first-layer encryption ciphertext, $P_{11}$, the dynamic key $R_1$ and the signature information are uploaded to the cloud service provider as shared information, which is saved by the cloud service provider. The signature information is obtained by signing $P_{12}$, and thus $P_{11}$ is shared to enable each end to verify the signature information.

The data owner can generate any dynamic key according to the public and private key pair of the data owner at different moments. The data owner uses different dynamic keys to encrypt different shared files, thereby realizing the fine-grained encryption function. At the same time, in order to classify the same type of shared files, the same type of shared files can be encrypted with the same dynamic key. The files can be classified according to a level of importance, for example, general, medium and important. In addition, the files can also be classified according to the generation time.

As shown in FIG. 5, the data owner downloads the shared information $\{R_1, P_{11}, C_1, C, \sigma\}$ from the cloud service provider, and then calculates the dynamic encryption public key $P_{11}$ and the dynamic encryption private key $P_{12}$. The validity of a is verified by using the dynamic encryption public key $P_{11}$. The symmetric key k is obtained by decrypting $C_1$ using the dynamic encryption private key $P_{12}$. C is decrypted using k to obtain the plaintext of the file. It may be seen that the data owner may also download and decrypt the file ciphertext uploaded by the data owner from the cloud.

Figure 6:
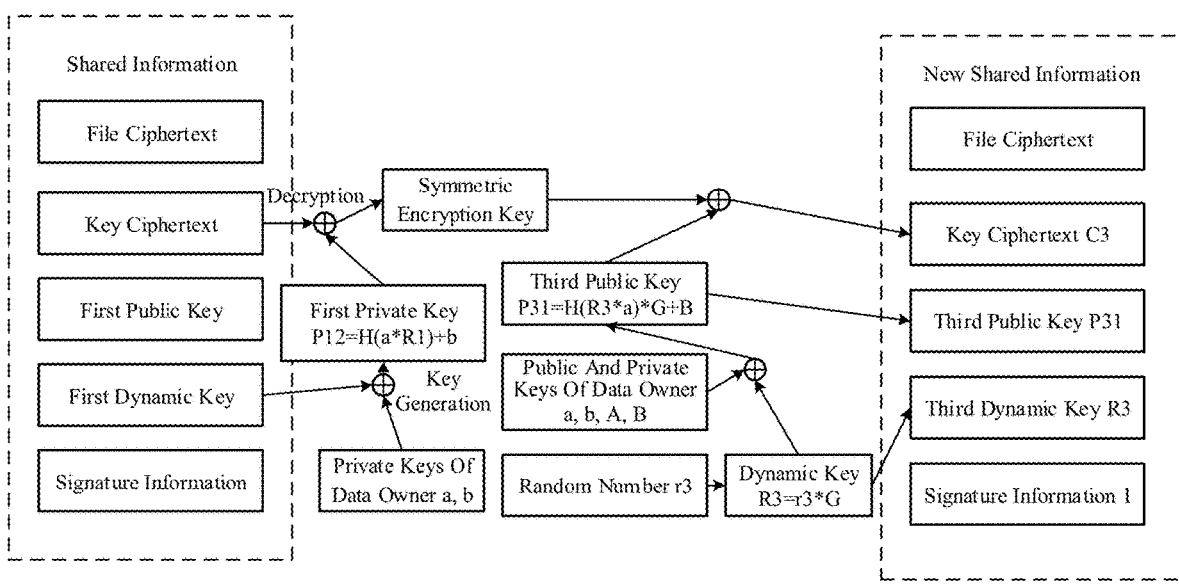
FIG. 6 is a schematic diagram of shared information updated by a data owner according to the present disclosure.

As shown in FIG. 6, the data owner can also update the shared information. The data owner generates a third dynamic key $R_3$ using a random number $r_3$. A third public key $P_{31}$ is generated using $R_3$ and unpaired public and private keys. A third private key $P_{32}$ is calculated using $R_3$ and two pairs of private keys. The symmetric key is re-encrypted by using $P_{31}$ to obtain a new key ciphertext $C_3$. Signature information 1 is generated by using $P_{32}$. The shared information $\{R_3, P_{31}, C_3, C, \text{signature information } \mathbf{1}\}$ newly obtained is sent to the cloud service provider. The cloud service provider keeps C unchanged and replaces other information. By updating the dynamic key by the data owner, the safe storage of the shared file may be realized when the dynamic key is leaked. Since the dynamic key is changed, the re-encryption key is changed, and the access right of the original shared file is updated.

Figure 7:
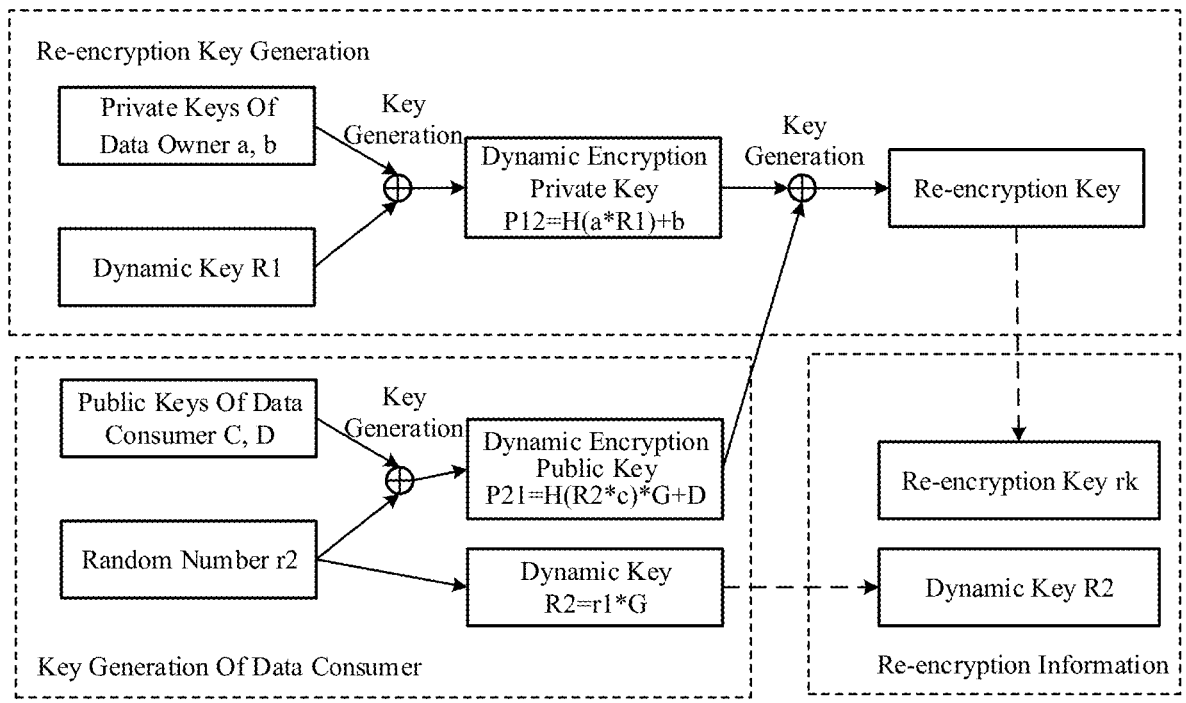
FIG. 7 is a schematic diagram of shared information accessed by a data consumer and a proxy re-encryption key generation according to the present disclosure.

As shown in FIG. 7, the data consumer obtains two pairs of asymmetric public and private keys (c, C) and (d, D) of the data consumer by using the key generation center, where c and d are private keys, and C and D are public keys, $C=cG$, $c \in Z_q$, $D=dG$, $d \in Z_q$. $r_2 \in Z_q$ is randomly selected, then the second dynamic key $R_2=r_2G$. The dynamic encryption public key $P_{21}=H(R_2*c)*G+D$, and $P_{21}$ is the second public key. The dynamically encryption private key $P_{22}=H(c*R_2)+d$, and $P_{22}$ is the second private key. After $R_2$ is generated, the random number $r_2$ can be deleted to ensure the security of the dynamic key and the dynamic encryption public key.

The data consumer requests the cloud service provider to access the shared information, and $P_{21}$ is included in request parameters. The cloud service provider preliminarily determines the validity of a user, and then sends $R_1$ and $P_{11}$ in the shared information and $P_{21}$ in the request parameters as a sharing request to the data owner. The cloud service provider is used to store encrypted data and perform proxy re-encryption. The cloud storage service system provided by the cloud service provider stores the shared information uploaded by the data owner and accepts the request of the data owner to access the data of the data owner.

The data owner also receives the sharing request of the data consumer sent by the cloud service provider, generates a re-encryption key, and uploads the re-encryption key to the cloud service provider.

The service provider obtains the re-encryption key uploaded by the data owner. As shown in FIG. 7, the service provider re-encrypts the shared information of the data owner using the re-encryption key to obtain re-encrypted shared information, and sends the re-encrypted shared information to the data consumer.

After obtaining the re-encryption key sent by the data owner, the service provider uses the re-encryption key to re-encrypt the first-layer ciphertext in the shared information to obtain the second-layer ciphertext $C_2$. The service provider sends $\{C_2, P_{11}, R_1, C_1, C, \sigma\}$ to the data consumer.

The data consumer calculates $R_2=r_2G$. $P_{22}$ is calculated by using $R_2$, c and d; $C_2$ is decrypted by using $P_{22}$ to obtain the symmetric key, and C is decrypted by using k to obtain the plaintext of the file $m=Dec_k(C)$, where Dec represents a decryption algorithm.

Figure 8:
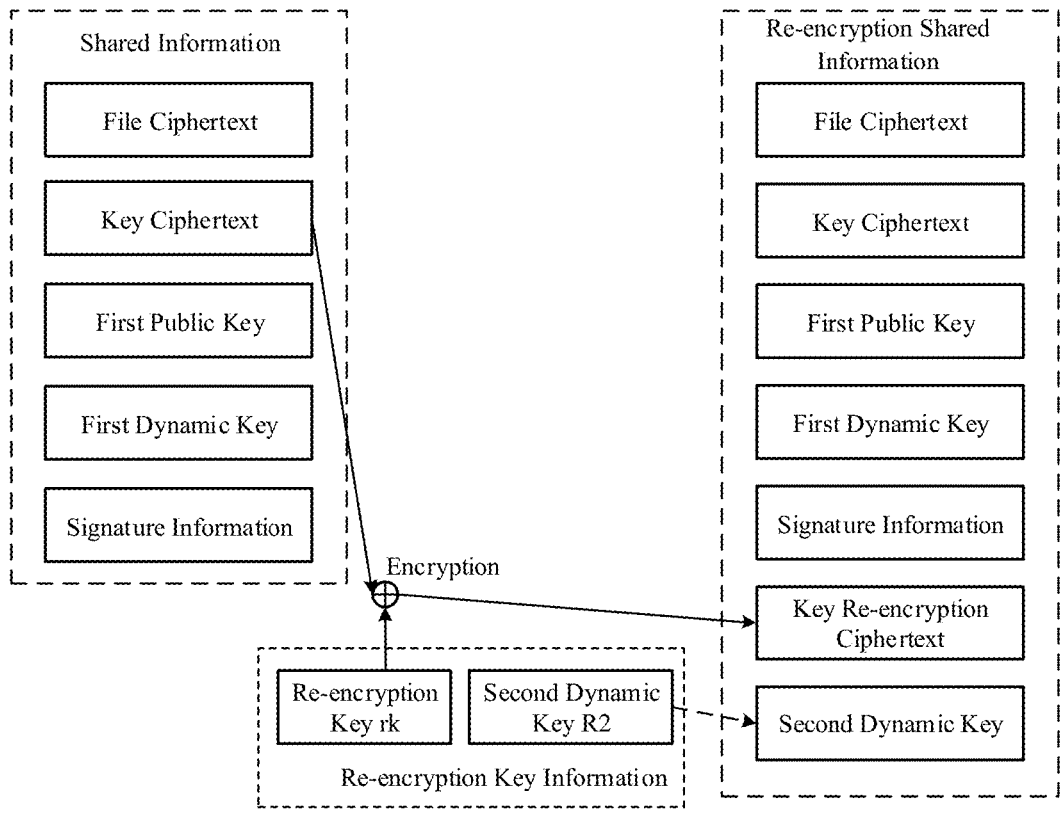
FIG. 8 is a schematic diagram of a comparison between re-encryption shared information and original shared information according to the present disclosure.

As shown in FIG. 8, the shared information sent by the data owner to the cloud has more the re-encryption key ciphertext and the second dynamic key than the shared information sent by the cloud to the data consumer for decrypting files, and the re-encryption key ciphertext is obtained by re-encrypting the first-layer ciphertext in the shared information using the re-encryption key.

It may be seen that in the embodiment, the dynamic key is used to encrypt the shared files, and the private key of the user does not directly participate in file encryption, thereby ensuring the security of the private key of the user. At the same time, in the embodiment, each shared file is encrypted with a separate key, the fine-grained decryption right assignment and encryption may be realized. At the same time, in order to classify the same type of shared files, the same type of shared files may be encrypted using the same dynamic key. When the data owner updates the dynamic key, the safe storage of the shared file may be realized when the dynamic key is leaked, and at the same time, the access right of the shared file may dynamically canceled.

An electronic device provided by an embodiment of the present disclosure is described below, and the electronic device described below and the file sharing method and system described above may be referred to each other.

Figure 10:
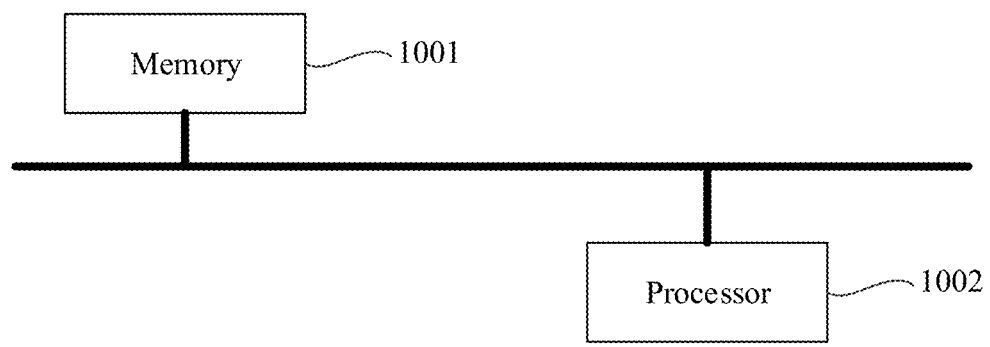
FIG. 10 is a structural block diagram of an electronic device according to the present disclosure.

Referring to FIG. 10, an embodiment of the present disclosure discloses an electronic device, including:

a memory 1001 configured to store a computer program; and a processor 1002 configured to execute the computer program to implement the method disclosed in any of the above embodiments.

A non-transitory readable storage medium provided by some embodiments of the present disclosure is described below, and the non-transitory readable storage medium below and the file sharing method, system and device described above may be referred to each other.

A non-transitory readable storage medium storing computer programs, wherein the computer programs, when executed by a processor, cause the processor to implement the file sharing method disclosed in the foregoing embodiments. With regard to the detailed steps of the method, reference may be made to corresponding contents in the foregoing embodiments, which will not be described in detail herein.

"First", "second", "third", "fourth" and the like as used in the present disclosure are used to distinguish similar objects, and are not necessarily used to describe a specific order or sequence. It should be understood that the data expressed in this manner is interchangeable under appropriate circumstances such that the embodiments described herein can be practiced in sequences other than those illustrated or described herein. Furthermore, the terms "comprising" and "having", as well as any variations thereof, are intended to cover a non-exclusive inclusion, e.g. a process, method or apparatus comprising a series of steps or elements is not necessarily limited to those steps or elements explicitly listed, but may include other steps or elements not explicitly listed or inherent to the process, method or apparatus.

It should be noted that the terms such as "first", "second" are for descriptive purposes only, and should not be understood as indicating or implying their relative importance or implicitly indicating the number of indicated technical features. Thus, the features defined as "first" and "second" may explicitly or implicitly include at least one of these features. In addition, the technical solutions of the various embodiments can be combined with each other, but it must be based on the realization of those skilled in the art. When the combination of technical solutions is contradictory or cannot be realized, it should be considered that the combination of technical solutions does not exist, nor within the scope of protection required by the present disclosure.

Various embodiments in the specification are described in a progressive manner, each embodiment focuses on the difference from other embodiments, and the same and similar parts of various embodiments can be referred to each other.

The steps of the methods or algorithms described in connection with the embodiments disclosed herein may be directly implemented by hardware, software modules executed by a processor, or a combination of both. Software modules can be placed in random access memory (RAM), internal memory, read-only memory (ROM), electrically programmable ROM, electrically erasable programmable ROM, registers, hard disk, removable disk, CD-ROM, or any other readable storage medium known in the technical field.

Herein, specific examples are used to illustrate the principles and implementation methods of the present disclosure. The descriptions of the above embodiments are only used to help understand the method and core idea of the present disclosure; meanwhile, for those skilled in the art, there will be changes in the specific implementation and scope of the present disclosure based on the core idea of the present disclosure. In summary, the content of the specification should not be construed as limiting the present disclosure.

The invention claimed is:

1. A file sharing method, being applicable to a file owning end, comprising:
   obtaining a target file to be shared, and determining a first dynamic key corresponding to the target file;
   generating a first private key based on the first dynamic key and double private keys of the file owning end;
   selecting unpaired public and private keys from two pairs of public and private keys of the file owning end, and generating a first public key based on the first dynamic key, the selected public and private keys;
   encrypting a symmetric key selected randomly using the first public key to obtain a key ciphertext;
   encrypting the target file using the symmetric key to obtain a file ciphertext;
   signing the first dynamic key, the first public key, the key ciphertext and the file ciphertext using the first private key to obtain signature information; and
   uploading the first dynamic key, the first public key, the key ciphertext, the file ciphertext and the signature information as shared information to a cloud sharing end to share the target file.

2. The method according to claim 1, wherein determining the first dynamic key corresponding to the target file comprises:
   determining a type of the target file, and determining the first dynamic key corresponding to the target file according to the type, wherein the type is classified according to a file format or a file importance.

3. The method according to claim 2, further comprising:
   recording the type and the first dynamic key corresponding to the target file, and generating historical upload information.

4. The method according to claim 2, wherein determining the first dynamic key corresponding to the target file according to the type comprises:
   in response to using the same first dynamic key for files of the same type, when there is a file of the same type as the target file in the historical upload information, determining a first dynamic key of the file of the same type in the historical upload information as the first dynamic key corresponding to the target file; and in response to using different first dynamic keys for the files of the same type, calculating the first dynamic key corresponding to the target file based on a random number.

5. The method according to claim 4, wherein calculating the first dynamic key corresponding to the target file based on the random number comprises:
   obtaining a base point of an elliptic curve and the random number; and
   calculating a product value of the base point of the elliptic curve and the random number, and determining the product value as the first dynamic key corresponding to the target file.

6. The method according to claim 1, wherein determining the first dynamic key corresponding to the target file comprises:
   in response to using different first dynamic keys for different files, calculating the first dynamic key corresponding to the target file based on a random number.

7. The method according to claim 1, further comprising:
   sending an update request of the shared information to the cloud sharing end to enable the cloud sharing end to update the shared information using new shared information of the target file in the update request.

8. The method according to claim 7, wherein sending the update request of the shared information to the cloud sharing end comprises:
   sending an update request for updating the first dynamic key, the first public key, the key ciphertext, the file ciphertext or the signature information to the cloud sharing end.

9. The method according to claim 1, further comprising:
   sending a deletion request of the shared information to the cloud sharing end to enable the cloud sharing end to delete the shared information using the deletion request.

10. The method according to claim 1, wherein signing the first dynamic key, the first public key, the key ciphertext and the file ciphertext using the first private key to obtain signature information comprises:
    splicing the first dynamic key, the first public key, the key ciphertext and the file ciphertext to obtain a splicing result;
    converting the splicing result into a hash string; and
    signing the hash string using the first private key to obtain the signature information.

11. A file sharing method, comprising:
    generating, by a file accessing end, a second dynamic key, generating a second public key based on the second dynamic key and two pairs of public and private keys of the file accessing end, and sending an access request of a target file to a cloud sharing end;
    querying, by the cloud sharing end, shared information of the target file based on the access request, wherein the shared information comprises a first dynamic key, a first public key, a key ciphertext, a file ciphertext and signature information; and sending the first dynamic key, the first public key and the second public key in the access request to a file owning end, wherein the shared information is obtained based on the method according to claim 1;
    generating, by the file owning end, a first public key based on the first dynamic key and two pairs of public and private keys of the file owning end, in response to the first public key sent by the cloud sharing end being equal to the first public key generated by the file owning end, generating a first private key based on the first dynamic key and double private keys of the file owning end, generating a re-encryption key based on the first private key and the second public key, and sending the re-encryption key to the cloud sharing end;
    re-encrypting, by the cloud sharing end, the key ciphertext using the re-encryption key to obtain a key re-encryption ciphertext, and sending the key re-encryption ciphertext, the first public key, the first dynamic key, the key ciphertext, the file ciphertext and the signature information to the file accessing end; and verifying, by the file accessing end, the signature information using the first public key to obtain a target result, in response to the target result being consistent with the first dynamic key, the first public key, the key ciphertext and the file ciphertext sent by the cloud sharing end, calculating a second private key using the second dynamic key and double private keys of the file accessing end, decrypting the key re-encryption ciphertext using the second private key to obtain a symmetric key, and decrypting the file ciphertext using the symmetric key to obtain a plaintext of the target file.

12. The method according to claim 11, wherein the target result comprises hash values of a first dynamic key, a first public key, a key ciphertext and a file ciphertext, the method further comprises:

determining whether the hash values of the first dynamic key, the first public key, the key ciphertext and the file ciphertext are consistent with hash values of the first public key, the first dynamic key, the key ciphertext and the file ciphertext sent by the cloud sharing end;

in response to the hash values of the first dynamic key, the first public key, the key ciphertext and the file ciphertext being consistent with the hash values of the first public key, the first dynamic key, the key ciphertext and the file ciphertext sent by the cloud sharing end, determining that the verification succeeds; and in response to the hash values of the first dynamic key, the first public key, the key ciphertext and the file ciphertext being inconsistent with the hash values of the first public key, the first dynamic key, the key ciphertext and the file ciphertext sent by the cloud sharing end, determining that the verification fails.

13. The method according to claim 11, wherein before querying, by the cloud sharing end, the shared information of the target file based on the access request, the method further comprises:

verifying, by the cloud sharing end, a validity of the file accessing end; in response to the file accessing end being valid, querying, by the cloud sharing end, the shared information of the target file based on the access request; and in response to the file accessing end being invalid, returning, by the cloud sharing end, a notification message indicating that an access is invalid to the file accessing end.

14. The method according to claim 13, wherein verifying, by the cloud sharing end, the validity of the file accessing end comprises:

verifying, by the cloud sharing end, whether the file accessing end is a valid user of the cloud sharing end;

in response to the file accessing end being the valid user of the cloud sharing end, determining that the file accessing end is valid; and in response to the file accessing end being not the valid user of the cloud sharing end, determining that the file accessing end is invalid.

15. The method according to claim 11, wherein before obtaining, by the file accessing end, the plaintext of the target file, the method further comprises:

querying, by the file owning end and/or the file accessing end the file ciphertext stored in the cloud sharing end based on a ciphertext search technology.

16. A file sharing method, being applicable to a file owning end, comprising:

downloading shared information from a cloud sharing end, wherein the shared information comprises a first dynamic key, a first public key, a key ciphertext, a file ciphertext and signature information, and the shared information is obtained based on the method according to claim 1;

after verifying that the signature information passes based on the first public key, generating a first private key based on the first dynamic key and double private keys of the file owning end;

decrypting the key ciphertext using the first private key to obtain a symmetric key; and decrypting the file ciphertext using the symmetric key to obtain a plaintext of a target file.

17. A file sharing system, comprising the file owning end, the cloud sharing end and the file accessing end according to claim 11, wherein the file owning end further performs the method according to claim 1.

18. The system according to claim 17, further comprising:

a key generation center configured to provide public and private key pairs and parameters for encryption and decryption for the file owning end and the file accessing end.

19. An electronic device, comprising:

a memory for storing a computer program; and a processor for executing the computer program to implement the method according to claim 1.

20. A readable storage medium storing computer programs, wherein the computer programs, when executed by a processor, cause the processor to implement the method according to claim 1.

* * * * *